US008446668B2

(12) United States Patent
Matsui

(10) Patent No.: US 8,446,668 B2
(45) Date of Patent: May 21, 2013

(54) MICROSCOPE APPARATUS

(75) Inventor: Kumiko Matsui, Yokohama (JP)

(73) Assignee: Nikon Corporation, Tokyo (JP)

( * ) Notice: Subject to any disclaimer, the term of this patent is extended or adjusted under 35 U.S.C. 154(b) by 430 days.

(21) Appl. No.: 12/248,702

(22) Filed: Oct. 9, 2008

(65) Prior Publication Data

US 2009/0168155 A1 Jul. 2, 2009

Related U.S. Application Data

(63) Continuation-in-part of application No. PCT/JP2007/063613, filed on Jun. 28, 2007.

(30) Foreign Application Priority Data

Jul. 4, 2006 (JP) .................................. 2006-184803

(51) Int. Cl.
*G02B 21/06* (2006.01)
(52) U.S. Cl.
USPC ............ 359/389; 359/368; 359/371; 359/385
(58) Field of Classification Search
USPC .................. 359/368–390, 483–502
See application file for complete search history.

(56) References Cited

U.S. PATENT DOCUMENTS

| | | | | | |
|---|---|---|---|---|---|
| 2,637,243 | A | * | 5/1953 | Marx | 359/370 |
| 2,660,923 | A | * | 12/1953 | Benford | 359/370 |
| 3,637,280 | A | * | 1/1972 | Beyer et al. | 359/370 |
| 4,200,353 | A | * | 4/1980 | Hoffman | 359/370 |
| 5,708,526 | A | * | 1/1998 | Stankewitz | 359/386 |
| 6,798,511 | B1 | * | 9/2004 | Zhan et al. | 356/369 |
| 6,873,733 | B2 | * | 3/2005 | Dowski, Jr. | 382/232 |
| 2003/0030902 | A1 | | 2/2003 | Fukushima et al. | |
| 2005/0168808 | A1 | * | 8/2005 | Ishiwata | 359/368 |

FOREIGN PATENT DOCUMENTS

| | | |
|---|---|---|
| DE | 102 45 974 A1 | 4/2004 |
| EP | 0 069 263 A1 | 1/1983 |
| JP | 57-178212 | * 11/1982 |
| JP | 2-35408 | * 6/1990 |
| JP | 11-95174 A | 4/1999 |
| JP | 2004-318185 A | 11/2004 |

OTHER PUBLICATIONS

Courtens, E. and Pohl, D.W., Microscope attachment for improved visibility of weak phase objects, Technical Disclosure Bulletin, Apr. 1980, p. 5085, vol. 22, No. 11, XP001659598.
Hoffman, R. and Gross, L..., Modulation contrast microscope, Applied Optics, Optical Society of America, US, May 1, 1975, pp. 1169-1176, vol. 14, No. 5, XP002603823, ISSN: 0003-6935, DOI:DOI:10.1364/AO.14.001169.

* cited by examiner

*Primary Examiner* — Thong Nguyen
(74) *Attorney, Agent, or Firm* — Miles & Stockbridge P.C.

(57) ABSTRACT

A microscope apparatus includes an illumination optical system that illuminates a sample with illumination light from a light source; an imaging optical system that converges light emitted from the sample to form a sample image by an objective lens; an aperture member disposed in the illumination optical system in the vicinity of a conjugate plane of a rear focal plane of the objective lens and having an aperture for limiting illumination light; and a filter member that includes a phase plate disposed in the imaging optical system in the vicinity of the objective lens rear focal plane or in the vicinity of the conjugate plane of the objective lens rear focal plane and having first and second phase areas introducing a 180-degree phase difference into the light from the sample; a phase boundary portion between the first and second phase areas being disposed in a conjugate aperture of the aperture.

10 Claims, 14 Drawing Sheets

FIG. 5A
FIG. 5B
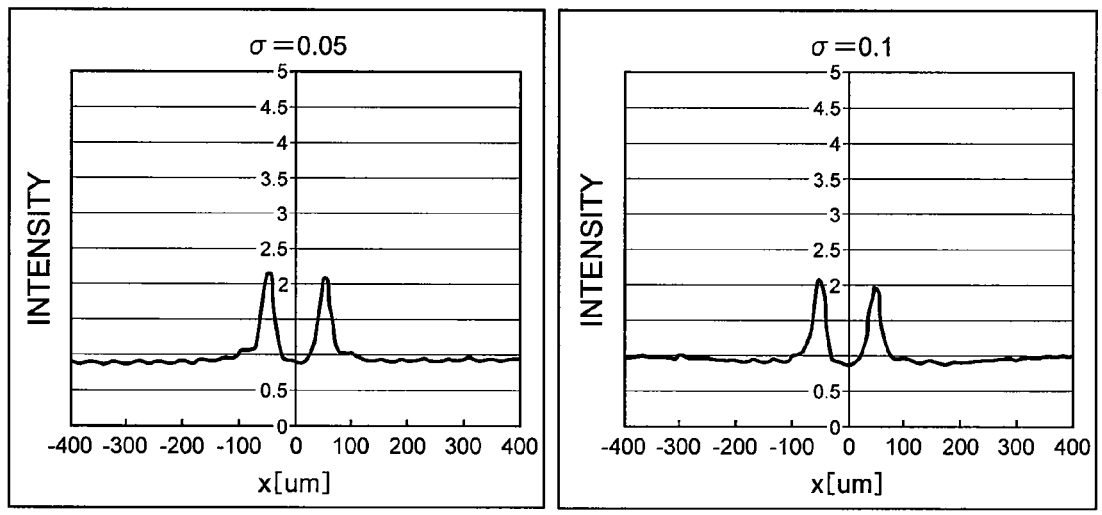
FIG. 5C
FIG. 5D
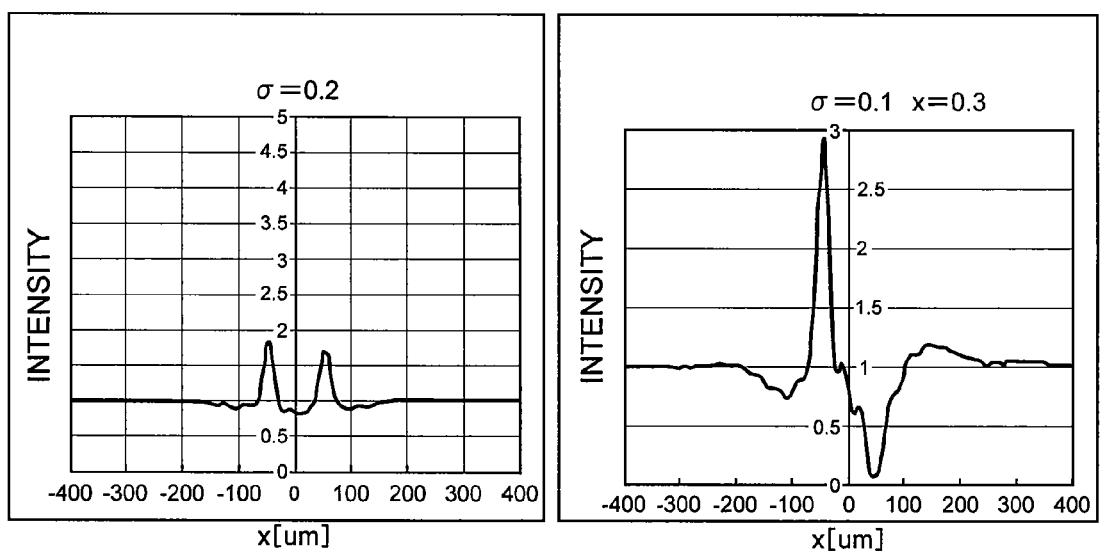

MICROSCOPE APPARATUS

CROSS-REFERENCE TO RELATED APPLICATION

This application is a continuation-in-part of International Application No. PCT/JP2007/063613 filed Jun. 28, 2007.

TECHNICAL FIELD

The present invention relates to a microscope apparatus.

BACKGROUND ART

An object to be observed by a microscope is mainly divided into two categories, in which one is an amplitude object and the other is a phase object. Since the amplitude object varies brightness or colors thereof, the variation can be detected as a contrast by an eye or an imaging device such as a CCD. On the other hand, since a phase object only varies phase of light, it shows a poor contrast and hardly distinguishable as it is. Accordingly, there has been proposed various methods for changing phase variation of a phase object into discernible variation in contrast such as Japanese Patent Application Laid-Open No. 11-95174.

However, in examples disclosed in Japanese Patent Application Laid-Open No. 11-95174, in order to make phase variation of a phase object discernible variation in contrast, a light source is limited to a coherent light source.

DISCLOSURE OF THE INVENTION

The present invention is made in view of the above-described problems and has an object to provide a microscope apparatus capable of observing phase variation of a phase object with sufficient contrast with a white light source having an area such as a halogen lamp and a mercury lamp commonly used in a microscope.

According to a first aspect of the present invention, there is provided a microscope apparatus comprising: an illumination optical system that illuminates a sample with illumination light emitted from a light source; an imaging optical system that converges light emitted from the sample to form a sample image by an objective lens; an aperture member that is disposed in the illumination optical system in the vicinity of a conjugate plane of a rear focal plane of the objective lens and has an aperture for limiting the illumination light; and a filter member that includes a phase plate that is disposed in the imaging optical system in the vicinity of the rear focal plane of the objective lens or in the vicinity of the conjugate plane of the rear focal plane of the objective lens and has a first phase area introducing phase difference of 180 degrees into the light from the sample and a second phase area; a phase boundary portion between the first phase area and the second phase area being disposed in a conjugate aperture of the aperture.

In the first aspect of the present invention, it is preferable that the aperture is a slit aperture, and the phase boundary portion is substantially parallel to a long sides direction of the slit aperture.

In the first aspect of the present invention, the following conditional expression (1) is preferably satisfied:

$$0.05 \leq d1/(2 \times NA \times f \times m) \leq 0.6 \tag{1}$$

where d1 denotes a short side width of the slit aperture, NA denotes a numerical aperture of the objective lens, f denotes a focal length of the objective lens, and m denotes magnification from the rear focal plane of the objective lens to the plane in the illumination optical system where the slit aperture is disposed.

In the first aspect of the present invention, it is preferable that the filter member further includes a transmittance controlling plate that controls transmittance of the phase plate at the conjugate position of the slit aperture, and the transmittance controlling plate has substantially constant transmittance over the conjugate position of the slit aperture, and transmittance t preferably satisfies the following conditional expression (2):

$$0 \leq t \leq 50 \text{ (unit: \%)} \tag{2}$$

In the first aspect of the present invention, it is preferable that, in the phase plate, when the phase boundary is assumed to be the Y axis, the axis perpendicular to the Y axis and the optical axis is X axis, and the point of intersection of the X axis and the Y axis is to be an origin, the filter member further includes a transmittance controlling plate that has transmittance distribution such that transmittance of the filter member becomes minimum at the origin, and higher as being away from the origin, and the transmittance distribution is symmetrical with respect to the Y axis.

In the first aspect of the present invention, it is preferable that, in the phase plate, when the phase boundary is assumed to be the Y axis, the axis perpendicular to the Y axis and the optical axis is X axis, and the point of intersection of the X axis and the Y axis is to be an origin, the filter member further includes a transmittance controlling plate that has transmittance distribution such that transmittance of the filter member becomes higher step-by-step as being away from the origin, and the transmittance distribution is symmetrical with respect to the Y axis.

In the first aspect of the present invention, it is preferable that the aperture of the aperture member is an annular aperture, the phase boundary portion of the phase plate is circular, and the phase boundary portion is disposed substantially the center of an annular aperture conjugate with the annular aperture.

In the first aspect of the present invention, the following conditional expression (3) is preferably satisfied:

$$0.025 \leq d2/(2 \times NA \times f \times m) \leq 0.6 \tag{3}$$

where d2 denotes an aperture width of the annular aperture, NA denotes a numerical aperture of the objective lens, f denotes a focal length of the objective lens, and m denotes magnification from the rear focal plane of the objective lens to the plane in the illumination optical system where the annular aperture is disposed.

In the first aspect of the present invention, it is preferable that the filter member further includes a transmittance controlling plate that controls transmittance of the phase plate at the conjugate position of the annular aperture, and the transmittance controlling plate has substantially constant transmittance over the conjugate position of the annular aperture, and transmittance t preferably satisfies the following conditional expression (2):

$$0 \leq t \leq 50 \text{ (unit: \%)}.$$

In the first aspect of the present invention, it is preferable that the filter member further includes a transmittance controlling plate that has transmittance distribution concentric with respect to the optical axis, and the concentric transmittance distribution is such that transmittance becomes minimum at an annular aperture position substantially conjugate with the annular aperture of the phase plate, becomes higher step-by-step as being away from the annular aperture position substantially conjugate with the annular aperture of the phase plate, and is substantially symmetrical between a direction from an inner circumference of the aperture conjugate with the annular aperture to the center direction of the annular aperture and a direction from an outer circumference of the aperture conjugate with the annular aperture to the outer direction.

In the first aspect of the present invention, it is preferable that the filter member includes a plurality of phase plates and a plurality of transmittance controlling plates, and the plurality of phase plates and the plurality of transmittance controlling plates are independently changeable with respect to the optical axis.

In the first aspect of the present invention, it is preferable that the filter member is changeable with respect to the optical axis.

The present invention makes it possible to provide a microscope apparatus capable of observing phase variation of a phase object with sufficient contrast with a white light source having an area such as a halogen lamp and a mercury lamp commonly used in a microscope.

BRIEF DESCRIPTION OF THE DRAWINGS

FIGS. 2A, 2B and 2C are diagrams showing a π phase plate disposed in the microscope apparatus according to the first embodiment, in which FIG. 2A shows construction and positional relation a slit aperture, FIG. 2B shows transmittance characteristics of the π phase plate, and FIG. 2C shows phase characteristics of the π phase plate.

FIGS. 5A through 5D are graphs showing imaging simulation results upon varying the value of σ where x=0 in the π phase plate shown in FIG. 2A.

FIGS. 7A, 7B and 7C are diagrams showing a π phase plate with a filter having transmittance t disposed in a microscope apparatus according to a second embodiment, in which FIG. 7A shows construction and positional relation of a slit aperture, FIG. 7B shows transmittance characteristics of the π phase plate, and FIG. 7C shows phase characteristics of the π phase plate.

FIGS. 9A, 9B and 9C are diagrams showing a π phase plate disposed in a microscope apparatus according to a third embodiment, in which FIG. 9A shows construction and positional relation of an annular slit aperture, FIG. 9B shows transmittance characteristics of the π phase plate, and FIG. 9C shows phase characteristics of the π phase plate.

FIGS. 10A, 10B and 10C are diagrams showing a variation of the third embodiment, in which FIG. 10A shows construction and positional relation of an annular aperture with a filter having transmittance t, FIG. 10B shows transmittance characteristics of the π phase plate, and FIG. 10C shows phase characteristics of the π phase plate.

FIGS. 14A, 14B and 14C are diagrams showing the variation of the fourth embodiment, in which FIG. 14A is a slider type filter member, FIG. 14B is a slider type π phase plate, and FIG. 14C is a combination of FIGS. 14A and 14B.

THE BEST MODE FOR CARRYING OUT THE INVENTION

Each embodiment according to the present invention is explained with reference to accompanying drawings. In the following embodiment, the embodiment is explained with a transmission type microscope.

First Embodiment

Figure 1:
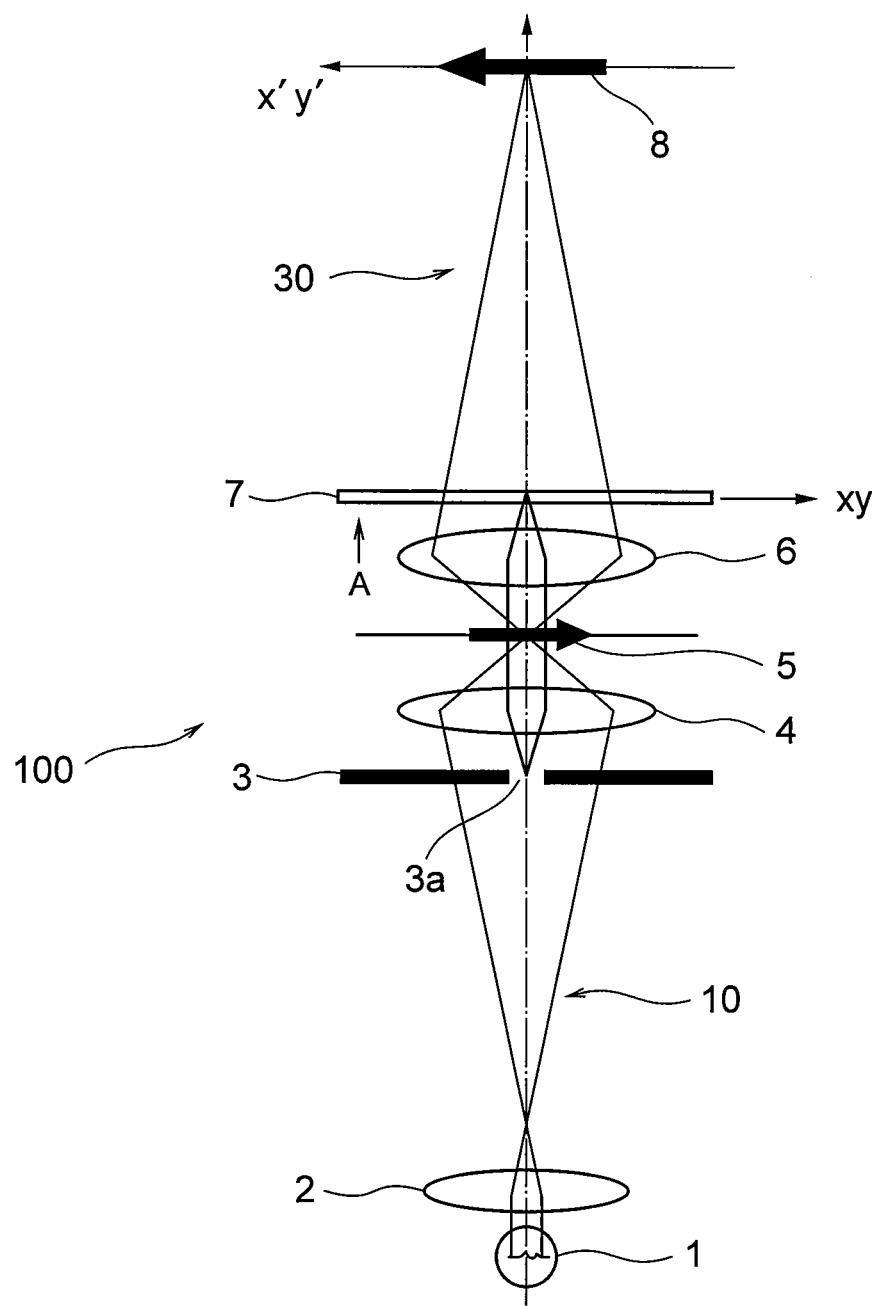
FIG. 1 is schematic diagram showing a microscope apparatus according to a first embodiment of the present invention.

FIG. 1 is schematic diagram showing a microscope apparatus according to a first embodiment of the present invention.

In FIG. 1, illumination light emitted from a white light source 1 such as a halogen lamp or a mercury lamp is converged by a collector lens 2, transmitted through a slit member 3 having a slit aperture 3a, and illuminates a sample 5 by an illumination optical system 10 including a condenser lens 4. Light transmitted through the sample 5 is converged by an objective lens 6, transmitted through a π phase plate 7 giving a phase difference of 180 degrees, and forms a sample image on an image plane 8 through an imaging optical system 30.

The π phase plate 7 is disposed in the vicinity of a rear focal plane of the objective lens 6, and the slit member 3 is disposed in the vicinity of a front focal plane of the condenser lens 4, which is a conjugate plane with the π phase plate 7. Here, the rear focal plane of the objective lens 6 and the front focal plane of the condenser lens 4 are conjugate planes with each other. The π phase plate 7 may be disposed in the vicinity of a conjugate plane with the rear focal plane of the objective lens 6 in the imaging optical system 30. The slit member 3 may be disposed in the vicinity of a conjugate plane with the front focal plane of the condenser lens 4 in the illumination optical system 10.

Here, a Z axis is assumed in the direction of the optical axis, and XY axis is assumed on a plane perpendicular to the optical axis. The π phase plate 7 is movable in the XYZ directions. The movement in Z direction is set for corresponding variation in the position of the rear focal plane of the objective lens 6 upon changing the objective lens 6. Movement in XY directions are used for adjusting alignment of the π phase plate 7, and for adjusting a contrast upon eye observation or upon obtaining images by an imaging device (not shown). In this manner, the microscope apparatus 100 is constructed.

Figure 2A:
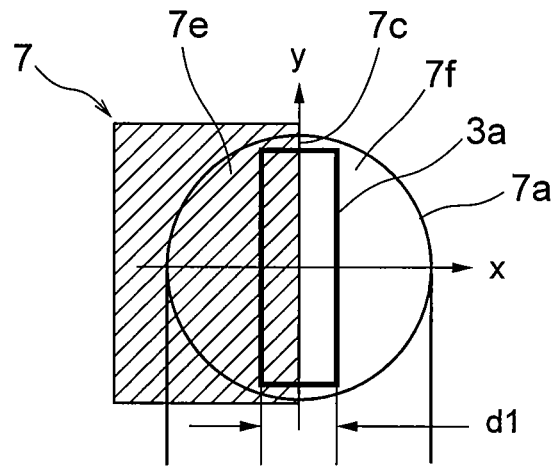
Figure 2B:
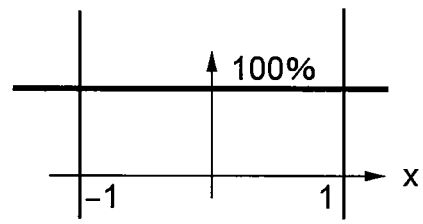
Figure 2C:
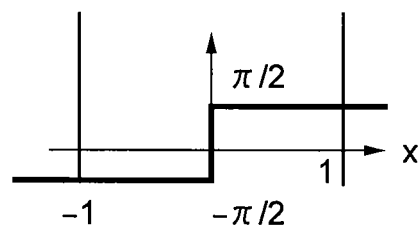

FIGS. 2A, 2B and 2C are diagrams showing a π phase plate disposed in the microscope apparatus according to the first embodiment. FIG. 2A shows construction and positional relation of a slit aperture seen from an arrow A in FIG. 1 and XY axes, which are perpendicular to the optical axis, are perpendicular to each other and included in the plane of the π phase plate 7. In FIG. 2A, an outer circle 7a denotes an effective diameter of an objective pupil of the objective lens 6, and the effective diameter of the objective pupil is normalized by x=1 and y=1. Such normalization is applied to other embodiments. A rectangular solid line in FIG. 2A shows a conjugate aperture of the slit aperture 3a of the slit member 3, which is a projected image of the slit aperture 3a on the plane of the π phase plate 7 and is denoted by the same symbol of 3a. FIG. 2B shows transmittance distribution of the π phase plate in the X axis direction corresponding to the objective pupil diameter. FIG. 2C shows phase distribution of the π phase plate 7. The π phase plate 7 has a phase plate 7e having a phase difference of −π/2 on the −X side with respect to the Y axis, and a phase plate 7f having a phase difference of +π/2 on the X side with respect to the Y axis, and a case that the phase boundary 7c, which is the boundary of the both plates, is coincide with the Y axis is shown. In this case, the phase plate 7e has a phase difference of −π/2 and the phase plate 7f has a phase difference of +π/2, and the case the total phase difference is π is explained. However, the present embodiment is not limited to the above-described condition, and it is sufficient that light from the sample passing through the phase plate 7f has a phase difference of π (180 degrees) with respect to light from the sample passing through the phase plate 7e. Moreover, the reason why the π phase plate 7 has transmittance distribution or phase distribution having a value other than 0 on the outside of the outer circle 7a is that the effective diameter of the objective pupil of the objective lens 6 is not blocked upon moving the π phase plate 7 in XY directions.

Then, the imaging simulation is explained.

Phase distribution F(x) in X axis direction within the outer circle 7a shown in FIG. 2C is shown by the following expression (a1):

$$F(x) = i \cdot sgn(x) \quad (a1)$$

where $$sgn(x) = 1, \ 0 < x \leq 1$$
$$= 0, \ x = 0$$
$$= -1, \ -1 \leq x < 0.$$

Expression (a1) is a transfer function in a frequency space of one-dimensional Hilbert transform. In phase distribution shown in FIG. 2C, since phase difference is π at the boundary x=0, approximately a half of light transmitting through the sample 5 having phase distribution receives phase shift π, and reaches the image plane 8 to make interference. As a result, phase distribution of the sample 5 becomes visible as intensity distribution on the image plane 8.

How does phase distribution on the sample 5 become visible as a sample image on the image plane 8 is explained below.

As a matter of simplicity, one-dimension (X axis direction) is to be considered. Moreover, the slit aperture 3a is assumed to be an infinitesimal pinhole. Amplitude distribution of the sample 5 upon being illuminated with a point source is s(x'), and Fourier transform thereof is S(x). Amplitude distribution of the sample image on the image plane 8 is g(x'), and Fourier transform thereof is G(x). Then, S(x), G(x), and F(x) are shown by the following expression (a2):

$$G(x) = S(x) \cdot F(x) \quad (a2)$$

In this case, when the sample 5 is assumed to be a weak phase object, $$s(x') = \exp(i\phi(x')) \approx 1 + i\phi(x') \quad (a3)$$

and diffracted light from the sample 5 is given by Fourier transform thereof.

$$S(x) = \delta(x) + \Phi(x) \quad (a4)$$

where $\Phi(x)$ denotes Fourier transform of $\phi$.

Substituting this into expression (a2), phase distribution component $\Phi(x)$ is left.

$$G(x) = \Phi(x) \cdot F(x) \quad (a5)$$

Since F(x) is a transfer function in a frequency space of Hilbert transform, assuming that φH(x') is Hilbert transform of φ(x'), amplitude distribution of the image g(x') is $$g(x') = \phi H(x') \quad (a6).$$

Intensity distribution is $$|g(x')|^2 = \phi H(x')^2 \quad (a7).$$

When this is moved to the image space, convolution of s(x'), which corresponds distribution that the sample 5 is illuminated by a point source, and inverse Fourier transform of f(x') as a point spread function becomes g(x') shown in the following expression (a8):

$$g(x') = s(x') * f(x') \quad (a8)$$

where "*" denotes convolution.

Figure 3:
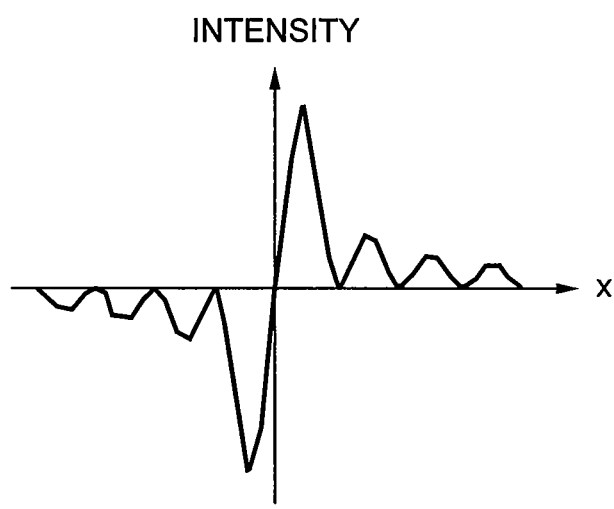
FIG. 3 is a graph showing a response function of the π phase plate with a phase characteristic shown in FIG. 2C.

FIG. 3 is a graph showing f(x'). As shown in FIG. 3, point spread function in Hilbert transform has a contrast to a phase object, and the shape of the contrast has a contrast shape, and the contrast shape shows a so-called differential image.

Imaging simulation results by an ideal lens are shown below. Simulation condition is in a biological observation using a general purpose objective lens with a magnification of 40, and coherency of the illumination light a is expressed by the following expression (0):

$$\sigma = d1/(2 \times NA \times f \times m) \quad (0)$$

where d1 denotes an aperture width that limits illumination light, and corresponds to the slit width d1 in FIG. 2A.

In expression (0), a numerical aperture of the objective lens 6 is NA=0.6, the focal length of the objective lens 6 is f=5 mm, and the magnification from the rear focal plane of the objective lens 6 to the plane where the slit member 3 is disposed is m=1.

The sample is assumed to have transmittance=1 (100%), phase difference 100 nm, width W=100 μm (converted on the image plane), and a rectangular shape, and to be disposed at the center of the visual field (x=0). Observation wavelength λ=588 nm.

Figure 4A:
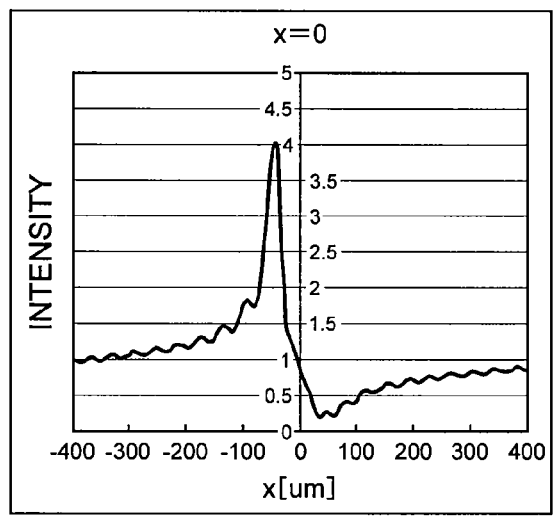
FIGS. 4A through 4D are graphs showing imaging simulation results upon varying the value of x where σ=0 in the π phase plate shown in FIG. 2A.
Figure 4B:
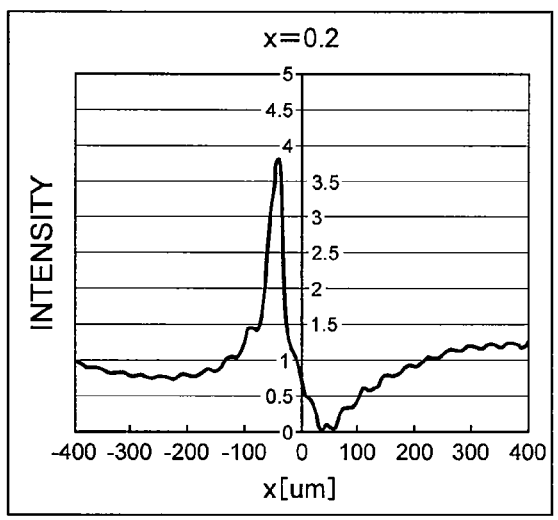
Figure 4C:
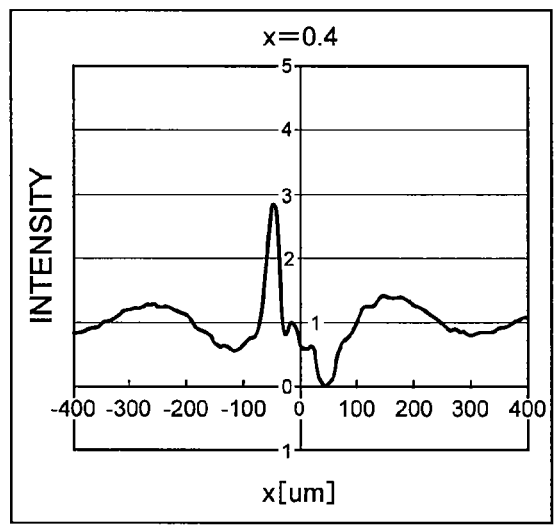
Figure 4D:
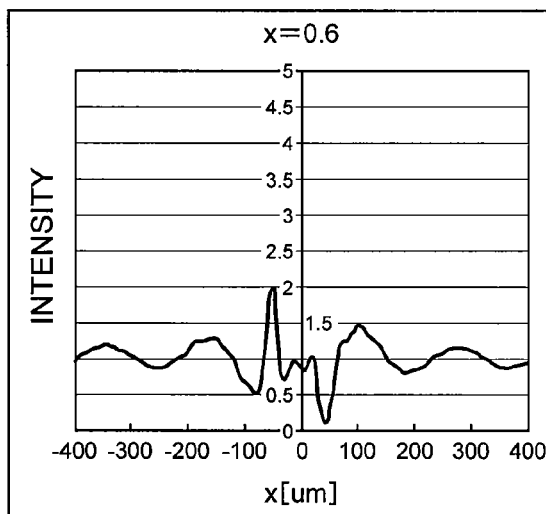

FIGS. 4A through 4D shows a simulation result where σ=0 in expression (0), in other words, the light source 1 is assumed to be a coherent light source. Here, σ=0 means the aperture width d1 is assumed to be infinitesimal, and does not mean d1=0. Moreover, when the coherent light source σ=0 is used, the slit member 3 is not necessary, so that the present invention becomes meaningless to this case. FIGS. 4A through 4D show the imaging simulation results. FIG. 4A corresponds to the case that the phase boundary 7c of the π phase plate 7 comes to the optical axis (origin: x=0), and FIGS. 4B through 4D are imaging simulation results corresponding to the cases the position of the π phase plate 7 is shifted to the X direction by 0.2 mm each. FIG. 4A shows a contrast image similar to a so-called differential image, however it is noisy image. For example, x value is −50 μm or less, and +50 μm or more, the background signal becomes noisy with a wave shape. As shown in FIGS. 4B through 4D, when the π phase plate 7 is shifted to the X direction, a contrast image similar to a so-called pseudo-relief image is obtained, however undulation with a frequency corresponding to the shift amount is superposed on the background signal. This is because the shift in the X direction of the π phase plate 7 makes frequency modulation corresponding to the shift amount. It is undesirable for a microscope image that such an undulation component is superposed on the background signal.

In this manner, when σ=0 in other words the light source 1 is a coherent light source, it is difficult to obtain excellent contrast image.

Then, in the present invention, imaging simulation results upon varying σ such that σ=0.05, 0.1, 0.2 (corresponding to the cases varying the slit width d1) at x=0 are shown in FIGS. 5A through 5C. As shown in FIGS. 5A through 5C, by disposing the slit member 3 having a slit aperture 3a with each slit width d1 in the illumination optical system 10, although contrast becomes lower than the case the coherent light source (σ=0, see FIG. 4A), noise on the background signal becomes low, and characteristic of a so-called differential image becomes good.

FIG. 5D is a graph showing an imaging simulation result where σ=0.1, x=0.3 mm. By shifting in the X direction, although the contrast forms a so-called pseudo-relief image, the undulation of the frequency modulation component does not superpose on the background signal in comparison with FIG. 4C, and almost flat background signal can be obtained.

This is because the frequency modulation components are accumulated within the range of the slit width d1 and averaged. According to the calculation, this effect is insufficient upon σ=0.05 shown in FIG. 5A, so that undulated noise is appeared on the background signal. However, the noise level is practically no problem in comparison with FIG. 4A. When σ=0.1 shown in FIG. 5B, the noise level is further reduced and excellent contrast image can be obtained. According to the result, it is understood that the lower limit of σ is about 0.05. In order to secure the effect of the present invention, it is preferable to set the lower limit of σ to 0.1.

As shown above, although the accumulation effect on the background signal becomes higher as the value of σ becomes larger, the contrast of the image becomes lower as shown in FIGS. 5A through 5C, so that the value of σ cannot be made large imprudently. There must be an upper limit. The upper limit of σ is considered below.

Figure 6:
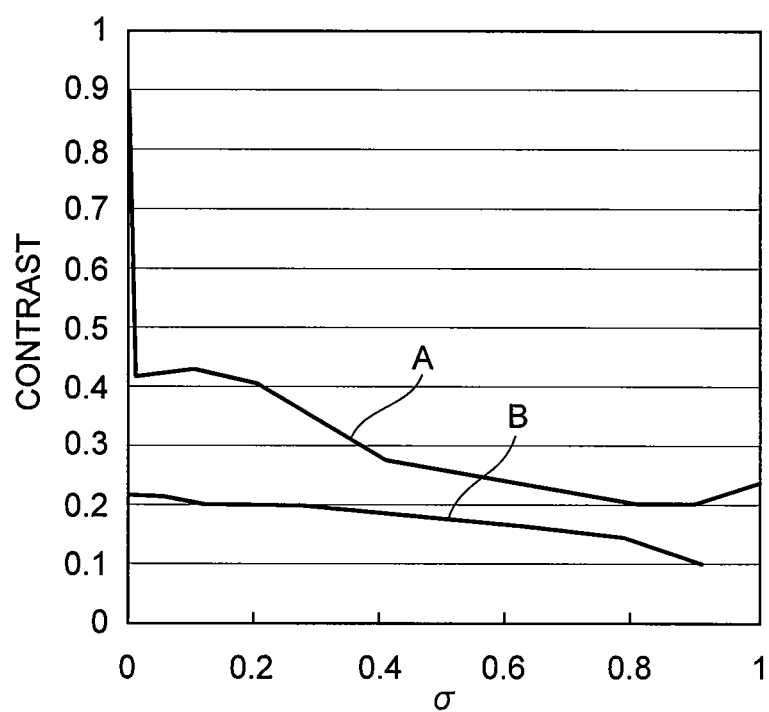
FIG. 6 is a graph showing contrast upon varying the value of σ where x=0 in the π phase plate shown in FIG. 2A in comparison with bright field observation.

FIG. 6 is a graph showing contrast upon varying the value of σ where x=0 as a solid line A. For the purpose of reference, there is another solid line B in FIG. 6 showing contrast where the same sample 5 is observed by the bright field observation. The value of contrast in the bright field observation becomes maximum 0.22 upon σ=0. Since higher contrast than the bright field observation is required, the value of σ showing the same contrast value found from the graph is about 0.6, so that this value becomes the upper limit of σ. In order to secure the effect of the present invention, it is preferable to set the upper limit of σ to 0.5. Accordingly, the contrast can be improved.

As a result, in a microscope apparatus according to the present invention, the following conditional expression (1) is preferably satisfied:

$$0.05 \leq d1/(2 \times NA \times f \times m) \leq 0.6 \quad (1)$$

where d1 denotes the aperture width of the slit aperture 3a, NA denotes a numerical aperture of the objective lens 6, f denotes a focal length of the objective lens 6, m denotes the magnification from the rear focal plane of the objective lens 6 to the plane where the slit aperture 3a is disposed in the illumination optical system 10.

In practical use, it is preferable that σ=0.4. However, it is not necessary to stick on the condition upon emphasizing contrast or noise reduction effect, so that σ value may be selected within the scope of conditional expression (1) in accordance with its use and purpose.

Second Embodiment

Then, a microscope apparatus according to a second embodiment of the present invention is explained with reference to FIGS. 7A, 7B, 7C, and 8A through 8F. The microscope apparatus 100 according to the second embodiment has the same configuration of the optical system of the microscope apparatus 100 according to the first embodiment, and the only difference is that a portion of the π phase plate has a filter, which controls transmittance, so that the explanation of the over all configuration is the same as that of the first embodiment. Accordingly, duplicated explanations are omitted.

Figure 7A:
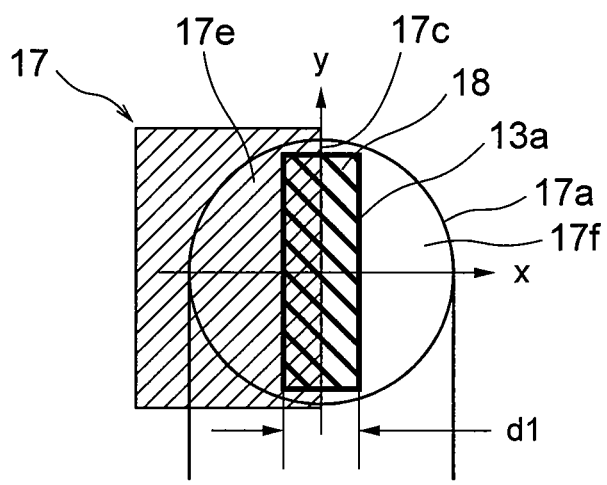
Figure 7B:
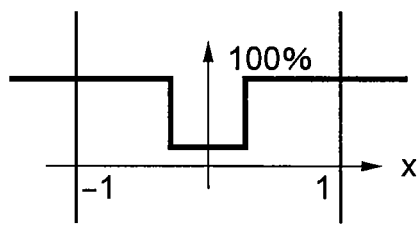
Figure 7C:
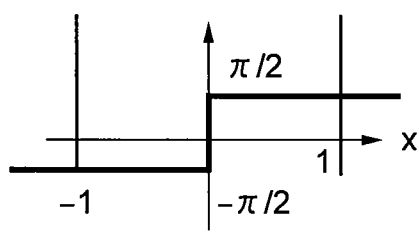

FIGS. 7A, 7B and 7C are diagrams showing a π phase plate 17 with a filter having transmittance t disposed in a microscope apparatus 100 according to a second embodiment, in which FIG. 7A shows construction of the π phase plate 17, FIG. 7B shows transmittance characteristics of the π phase plate 17, and FIG. 7C shows phase characteristics of the π phase plate 17.

In FIG. 7A, an outer circle 17a of the π phase plate 17 denotes an effective diameter of an objective pupil of the objective lens 6. A rectangular solid line in FIG. 7A shows a conjugate aperture of the slit aperture 13a of the slit member 3, which is a projected image of the slit aperture 13a on the plane of the π phase plate 17 and is denoted by the same symbol of 13a. A filter 18 having transmittance t is formed to cover the slit aperture 13a. Moreover, the filter 18 may be formed on the π phase plate 17, or may be constructed independently and combined integrally with the n phase plate 17.

FIG. 7B shows transmittance distribution of the π phase plate 17 in the X axis direction corresponding to the objective pupil diameter 17a, and transmittance is decreased in a portion of the filter 18. FIG. 7C shows phase distribution of the π phase plate 17. The π phase plate 17 has a phase plate 17e having a phase difference of −π/2 on the −X side with respect to the Y axis, and a phase plate 17f having a phase difference of +π/2 on the X side with respect to the Y axis, and a case that the phase boundary 17c, which is the boundary of the both plates, is coincide with the Y axis is shown. In this case, the phase plate 17e has a phase difference of −π/2 and the phase plate 17f has a phase difference of +π/2, and the case the total phase difference is π is explained. However, the present embodiment is not limited to the above-described condition, and it is sufficient that light from the sample passing through the phase plate 17f has a phase difference of π (180 degrees) with respect to light from the sample passing through the phase plate 17e. In this manner, the π phase plate 17 is constructed. Similar to the first embodiment, the slit width d1 preferably satisfies conditional expression (1).

Figure 8A:
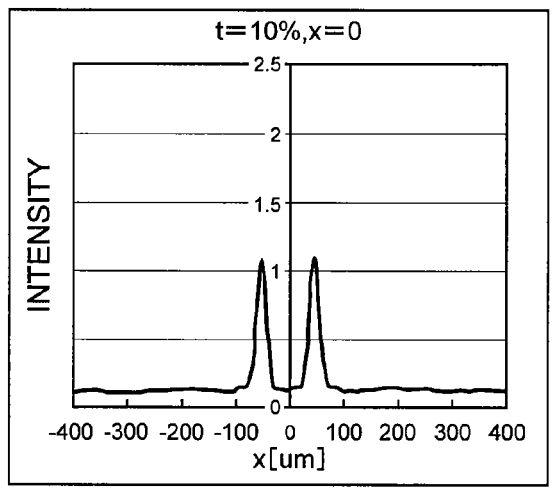
FIGS. 8A through 8F are graphs showing imaging simulation results upon varying the values of x and t where σ=0.1 in the π phase plate shown in FIG. 7A.

Since transmittance t of the filter 18 covering the slit aperture 13a with the slit width d1 is 50% or less, so-called direct light (0-order diffracted light) component is reduced as shown in FIG. 8A, so that the visual field becomes dark in comparison with the first embodiment. However, the signal intensity becomes relatively strong with respect to the background signal. As a result, contrast becomes higher than that of the first embodiment. In particular, contrast increase effect is conspicuous in a state where the shift amount in the X direction is small (in the vicinity of x=0). Suitable transmittance may be chosen for the filter 18 in accordance with its use and purpose.

Figure 8B:
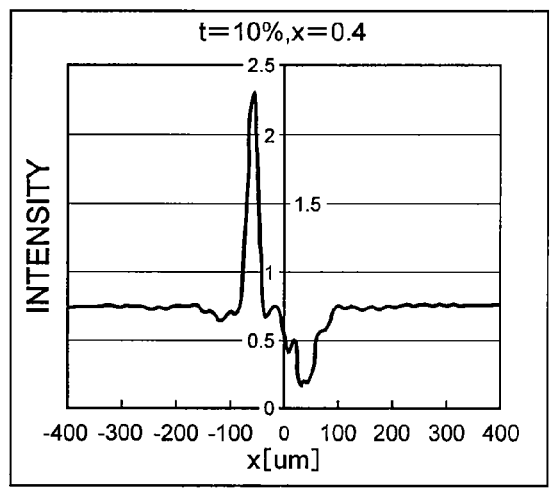
Figure 8C:
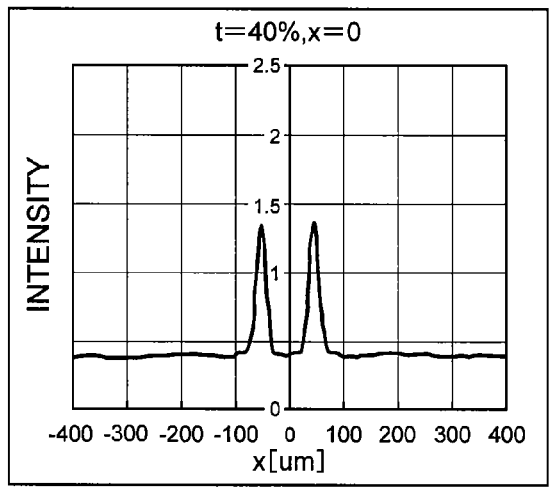
Figure 8D:
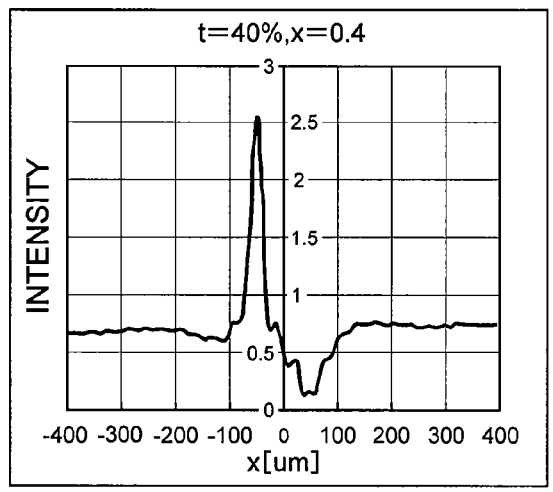
Figure 8E:
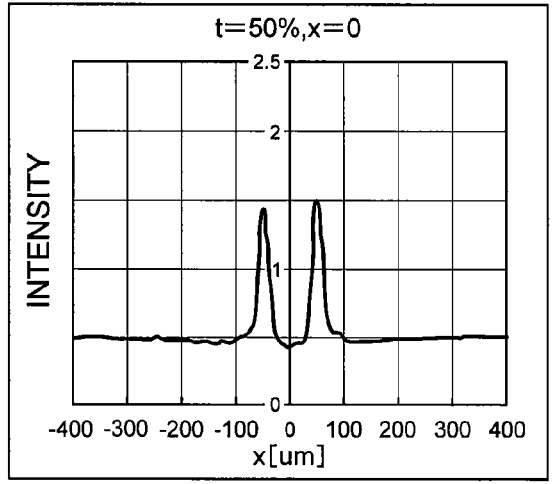
Figure 8F:
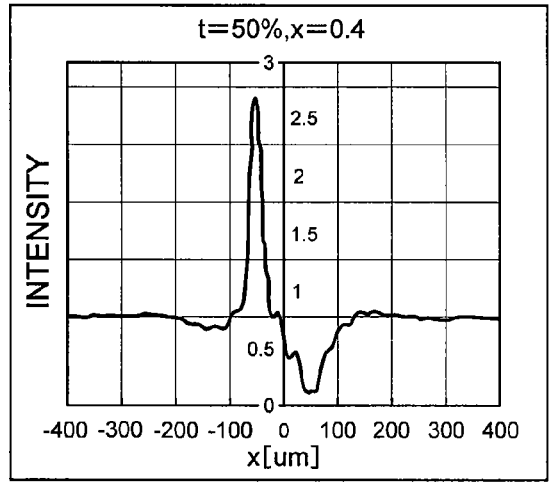

FIGS. 8A through 8F are graphs showing imaging simulation results upon varying the values of x and t where σ=0.1 in the π phase plate 17 shown in FIG. 7A. FIG. 8A is a case where t=10%, x=0, FIG. 8B is a case where t=10%, X=0.4 mm shifted in the X direction. The simulation condition is the same as the first embodiment. In comparison with FIG. 5, in particular the case where x=0 (see FIGS. 5B and 8A), contrast increases. Imaging simulation results are respectively shown such that FIG. 8C is the case where t=40%, x=0, FIG. 8D is a case where t=40%, x=0.4 mm, FIG. 8E is a case where t=50%, x=0 mm, and FIG. 8F is a case where t=50%, x=0.4 mm. From these figures, it is understood that although light intensity of the background increases and contrast relatively becomes lower as the transmittance t increases, even in the case where t=50%, contrast is sufficiently secured for practical use.

Accordingly, transmittance t is preferably satisfies the following conditional expression (2):

$$0 \leq t \leq 50 \text{ (unit: \%)} \quad (2)$$

In the second embodiment, a case where transmittance t is constant within the aperture width d1 of the slit aperture 13a is explained. As a variation of the second embodiment, a case where transmittance t is minimum at x=0 and increases as X value is apart from x=0 along the X axis, and transmittance t is symmetrical with respect to the Y axis may be applicable. For example, transmittance t may be proportional to x value, proportional to $\sin^2(x)$, or incremental with respect to x value.

Third Embodiment

Then, a microscope apparatus according to a third embodiment of the present invention is explained. Since the third embodiment differs construction of a slit member and a phase plate thereof from that of the first embodiment, and the other constructions are the same as the first embodiment, so that only the phase plate and the aperture member are explained.

Figure 9A:
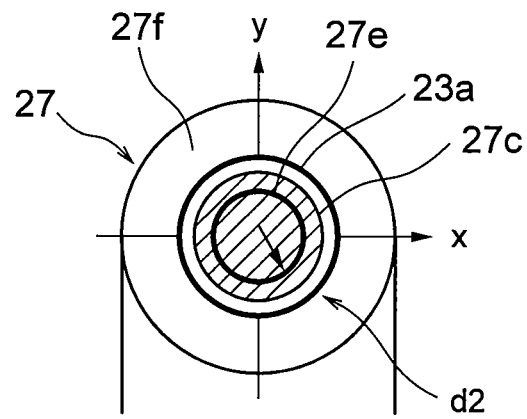
Figure 9B:
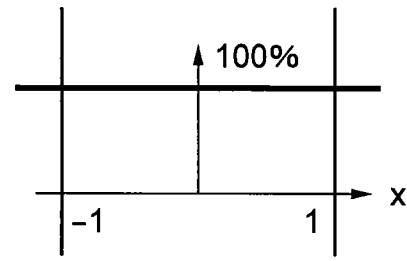
Figure 9C:
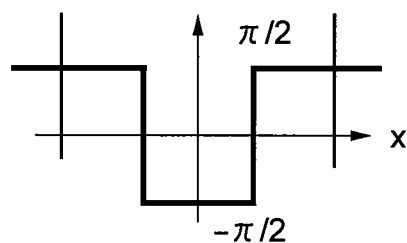

FIG. 9A is a diagram showing a π phase plate 27 disposed in a microscope apparatus according to the third embodiment, showing construction and positional relation of an annular aperture 23a formed on an aperture portion 3. In other words, in the third embodiment, an aperture member 3 with an annular aperture 23a having a width of d2 is disposed at the position where the slit member 3 is disposed in the FIG. 1, and a π phase plate 27 having a phase plate 27e introducing phase difference of −π/2 with a disc shape, and, in the outer circle side thereof, a phase plate 27f introducing phase difference of +π/2 with a disc shape is disposed in the vicinity of the rear focal point of the objective lens 6. FIG. 9B shows transmittance characteristics of the π phase plate 27, and FIG. 9C shows phase characteristics of the π phase plate 27. Although a case that the phase plate 27e has phase difference of −π/2, and the phase plate 27f has phase difference of +π/2 is explained, since the phase difference of both phase plates is good enough to be π, the present invention is not limited to the above-described construction.

In FIGS. 9A, 9B and 9C, the circular phase boundary portion 27c, which is a boundary between the phase plate 27e and the phase plate 27f, is disposed to come to about the center of the annular aperture 23a having the annular width d2 disposed the conjugate position of the π phase plate 27 of the illumination optical system 10.

An image obtained by a microscope apparatus 100, in which the π phase plate 27 and the annular aperture 23a are disposed, is similar to the one obtained in the first embodiment at x=0. Accordingly, the calculation result of the image is omitted. Although the image in the first embodiment has directional characteristics that the image has resolution only in the direction of the aperture width d1 (in other words, in X direction), since the sample 5 is illuminated annularly by the annular aperture 23a in the third embodiment, the image of the third embodiment does not have directional characteristics. Accordingly, the obtained two-dimensional image becomes a so-called edge-enhanced image.

The aperture width d2 of the annular aperture 23a and the aperture width d1 of the slit aperture 3a of the first embodiment satisfy the following relation:

$$d2 = d1/2.$$

As a result, the third embodiment preferably satisfies the following conditional expression (3) corresponding to conditional expression (1) of the first embodiment:

$$0.025 \leq d2/(2 \times NA \times f \times m) \leq 0.3 \quad (3).$$

Conditional expression (3) defines the same meaning of the first embodiment, so that duplicated explanations are omitted. In order to secure the effect of the present invention, it is preferable to set the lower limit of conditional expression (3) to 0.05. In order to secure the effect of the present invention, it is preferable to set the upper limit of conditional expression (3) to 0.25. In order to further secure the effect of the present invention, it is most preferable to set the upper limit of conditional expression (3) to 0.20.

Figure 10A:
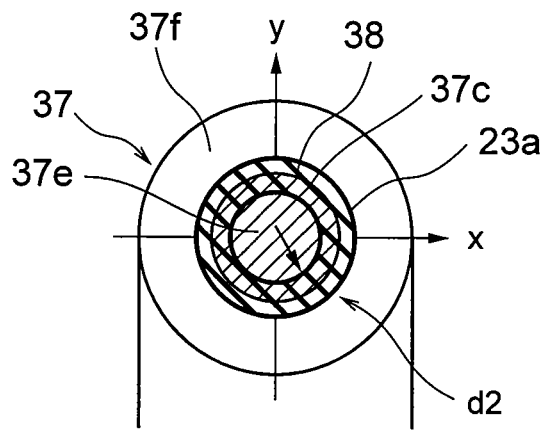
Figure 10B:
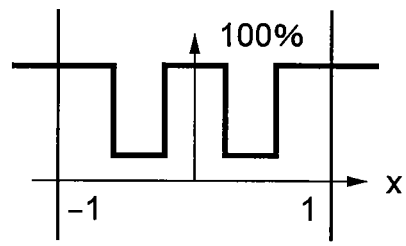
Figure 10C:
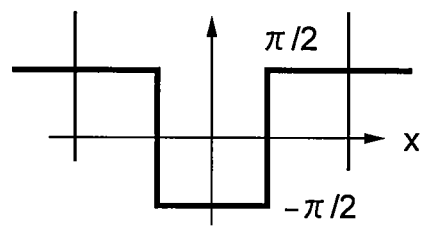

FIGS. 10A, 10B and 10C shows a variation of the third embodiment. FIG. 10A shows a π phase plate 37. FIG. 10B shows transmittance characteristics of the π phase plate 37. FIG. 10C shows phase characteristics.

In FIGS. 10A, 10B and 10C, a filter 38 having transmittance t is formed such that the π phase plate 37 has lower transmittance t at the annular aperture 23a having the annular width d2 than other portions. The filter 38 having transmittance t may be formed on the π phase plate 37, or the filter 38 may be constructed independently and combined integrally with the π phase plate 37.

Moreover, transmittance t preferably satisfies the following conditional expression (2) as same as the first embodiment:

$$0 \leq t \leq 50 \text{ (unit: \%)} \quad (2).$$

In this manner, with disposing filter 38 having transmittance t on the annular aperture 23a with the annular width d2, since the background light of the obtained sample image becomes dark and the signal light becomes relatively strong such as the second embodiment, the contrast becomes higher in comparison with the case that the area of the transmittance t is not exist such as FIG. 9.

Transmittance t of the filter portion 38 may be constant over the annular width d2 as shown above, or may be such that transmittance t becomes minimum at the boundary 37c of the phase difference and becomes gradually higher symmetrically with the boundary 37c. In this case, variation in transmittance t may be proportional to |r−rc| where rc denotes the radius of the boundary area 37, or proportional to sin 2(|r−rc|), or becomes gradually higher in accordance with |r−rc|.

Moreover, the phase plate 27, 37 are constructed movable in X, Y and Z directions, and the effect thereof is the same as the first embodiment.

Fourth Embodiment

Figure 11:
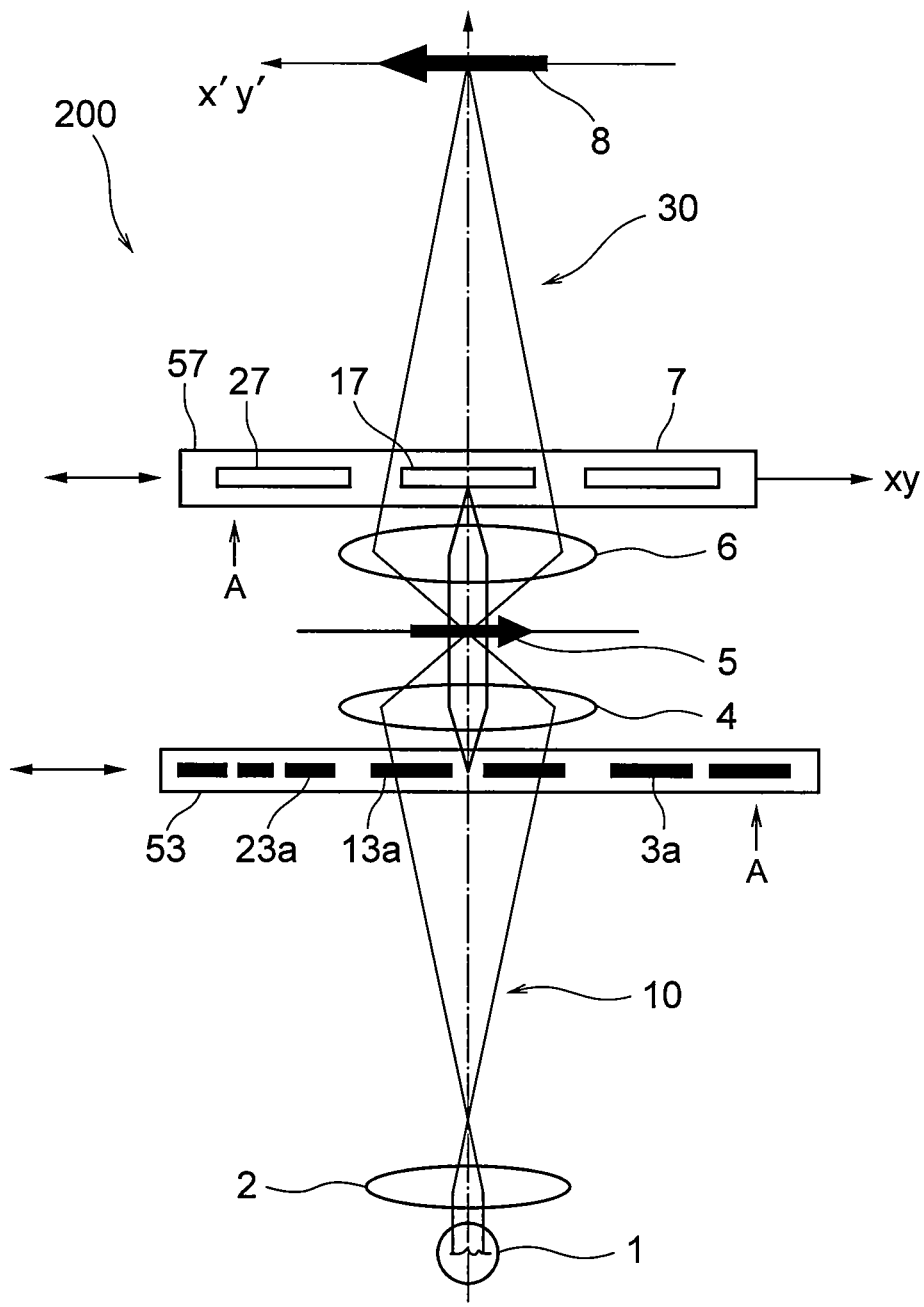
FIG. 11 is a schematic diagram showing a microscope apparatus according to a fourth embodiment of the present invention.

Then, a microscope apparatus according to a fourth embodiment of the present invention is explained. FIG. 11 is a schematic diagram showing the microscope apparatus according to the fourth embodiment of the present invention. The point where the fourth embodiment differs from the first embodiment through the third embodiment, is that the aperture member and the π phase plate are one each in the first through third embodiments, however, in the fourth embodiment, there are a plurality of apertures in the aperture member, and each aperture is movable to the optical axis of the illumination optical system, and there is a phase plate holder having a plurality of π phase plates corresponding to respective apertures movable to the optical axis of the imaging optical system. The same construction as the first embodiment is attached the same symbol as the first embodiment, and duplicated explanations are omitted.

In FIG. 11, a microscope apparatus 200 according to the fourth embodiment has a slider-type aperture member 53 disposed in the illumination optical system 10 on the conjugate position of the rear focal plane of the objective lens 6, and a slider-type phase plate holder 57 disposed in the vicinity of the rear focal plane of the objective lens 6 in the imaging optical system 30. The slider-type phase plate holder 57 may be disposed in the vicinity of the conjugate plane of the rear focal plane of the objective lens 6 in the imaging optical system 30. The slider-type aperture member 53 may be disposed in the vicinity of the conjugate plane of the front focal plane of the condenser lens 4 in the illumination optical system 10.

Figure 12:
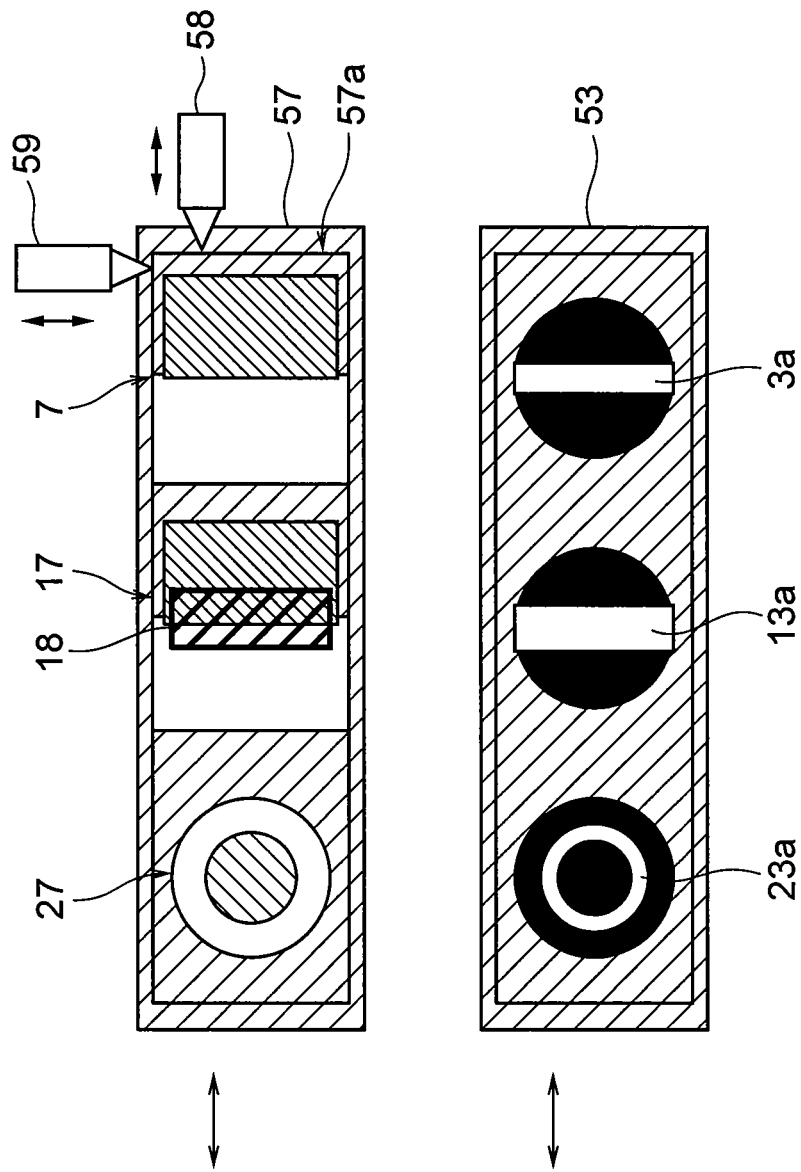
FIGS. 12A and 12B are diagrams respectively showing an example of a slider type aperture member and a slider type phase plate holder used in the fourth embodiment.

In the slider-type aperture member 53, slit apertures 3a, 13a, and an annular aperture 23a are disposed substantially on the same plane and movable to the optical axis of the illumination optical system 10 as shown in FIG. 12B. The aperture 3a is the same one explained in the first embodiment, the aperture 13a is in the second embodiment, and the aperture 23a is in the third embodiment, so that explanations regarding construction are omitted.

In the slider-type phase plate holder 57, the π phase plate 7 used in accordance with the slit aperture 3a, the π phase plate 17 with a filter 18 used in accordance with the slit aperture 13a, and the π phase plate 27 used in accordance with the annular aperture 23a are disposed substantially on the same plane interchangeable with respect to the optical axis as shown in FIG. 12A. The π phase plate 7 is the similar one explained in the first embodiment, the π phase plate 17 is the similar one explained in the second embodiment, and the π phase plate 27 is the similar one explained in the third embodiment, so that duplicated explanations are omitted. Moreover, respective π phase plates 7, 17 and 27 are held by a holding member 57a, which is equipped with a fine adjuster 58 for finely adjusting the holding member 57a in the X direction and a fine adjuster 59 for finely adjusting the holding member 57a in the Y direction in order to finely move the holding member 57a in XY directions perpendicular to the optical axis. Furthermore, the slider-type phase plate holder 57 is constructed movable even in Z direction for corresponding to variation in the rear focal plane upon changing the objective lens 6.

In the fourth embodiment, since the slider-type aperture member 53 and the slider-type phase plate holder 57 are constructed as described above, the optimum observation method corresponding to respective samples can be selected by changing combination of the aperture member 3a, 13a, or 23a with the π phase plate 7, 17 or 27. The holding member 57a of the phase plate holder 57 is movable in XY directions to adjust contrast of the image. In the fourth embodiment, although the slider-type aperture member 53 and the slider-type phase plate holder 57 are explained for changing, the other methods for changing such as a turret type for changing by rotation can be applied.

Moreover, when the aperture member is a slit aperture 3a or 13a, the slit width d1 satisfies conditional expression (1), and when the aperture member is the annular aperture 23a, the aperture width d2 satisfies conditional expression (3), and transmittance t of the filter 18 satisfies conditional expression (2).

Figure 13:
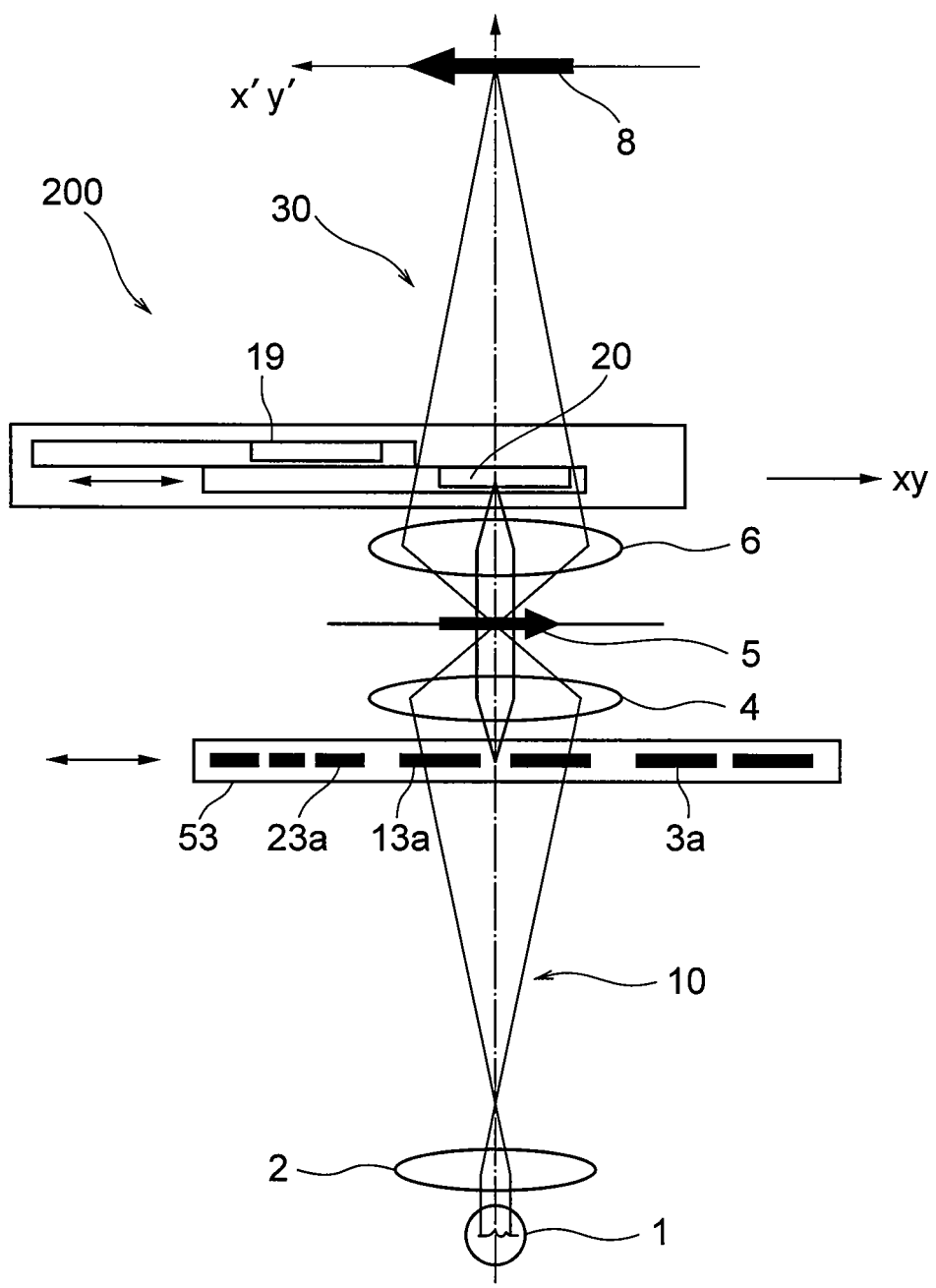
FIG. 13 is a diagram showing a variation of the microscope according to the fourth embodiment.
Figure 14A:
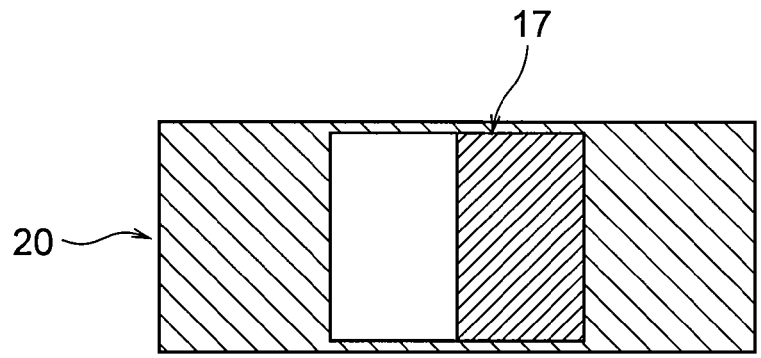
Figure 14B:
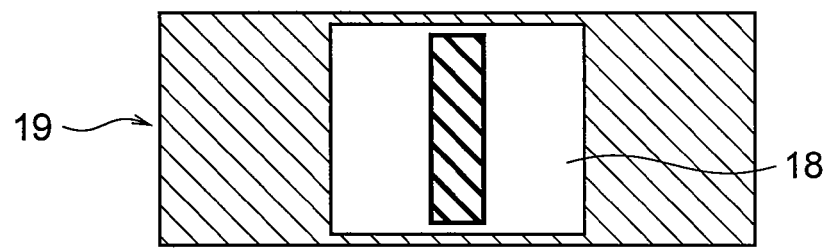
Figure 14C:
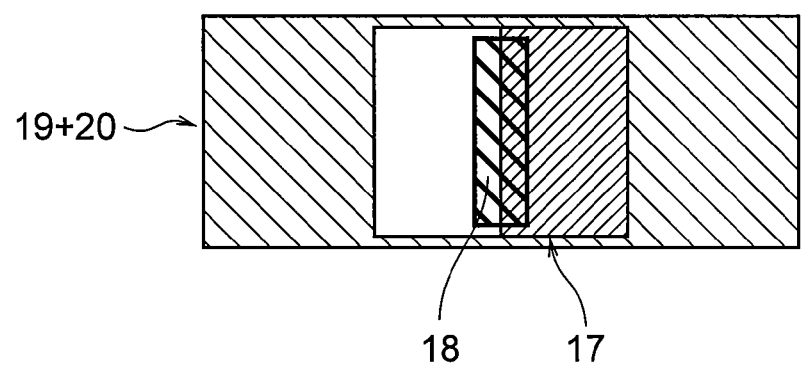

FIG. 13 and FIGS. 14A, 14B and 14C are diagrams showing a variation of the fourth embodiment of the present invention. FIG. 13 shows a microscope apparatus according to the variation. FIG. 14A shows a phase plate, FIG. 14B shows a filter, and FIG. 14C shows a state combined both of them. In the variation, the π phase plate 17 and the filter 18 for varying transmittance t are independently movable to the optical axis. The method for changing the aperture 3a, 13a and 23a is the same as described above.

In FIGS. 13, 14A, 14b and 14C, the slider-type filter member 19 having a filter 18 with transmittance t and the slider-type π phase plate 20 having the π phase plate 17 are removably disposed in the optical axis of the imaging optical system 30. The slider-type filter member 19 and the slider-type π phase plate 20 are removably disposed in the vicinity of the rear focal plane of the objective lens 6. The slider-type filter member 19 and the slider-type π phase plate 20 have the same construction as the second embodiment, so that the duplicated explanations of the operation and the effect are omitted.

In the present variation, the case that the slit aperture 13a is inserted in the optical axis of the illumination optical system 10, and the slider-type π phase plate 20 is inserted in the optical axis of the imaging optical system 30 is explained. When only the slider-type π phase plate 20 is inserted in the optical path, the microscope apparatus 100 according to the first embodiment is constructed, and, in addition, when the slider-type filter member 19 is further inserted in the optical axis of the imaging optical system 30, the π phase plate becomes the one having characteristics of the slider-type π phase plate 20 together with characteristics of the slider-type filter member 19, so that the microscope apparatus 100 according to the second embodiment can be realized. With providing phase plates having slightly different transmittance distribution or slightly different phase distribution, and by changing these phase plates, it becomes possible to realize various observation conditions.

Furthermore, when the slider-type filter member 19 and the slider-type π phase plate 20 are replaced by the slider-type filter member and the slider-type π phase plate each corresponding to the aperture shape disposed on the slider-type aperture 53, the similar effect as above-described each embodiment can be obtained.

Moreover, when the aperture member is a slit aperture 3a or 13a, the slit width d1 satisfies conditional expression (1), and when the aperture member is the annular aperture 23a, the aperture width d2 satisfies conditional expression (3), and transmittance t satisfies conditional expression (2).

In the above-described each embodiment, although a transmission type microscope is explained, the same effect can be obtained by a reflection type microscope. In a reflection type microscope, when a semi-transparent mirror is used together with the illumination optical system and the imaging optical system, an aperture member having an aperture or a slider-type aperture member is necessary to be disposed substantially conjugate position of the rear focal plane of the objective lens between a light source of the illumination optical system and the semi-transparent mirror, and a π phase plate or a slider-type phase plate holder or a filter member is necessary to be disposed substantially conjugate position of the rear focal plane of the objective lens between the semi-transparent mirror and the image plane.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A microscope apparatus comprising:
an illumination optical system that illuminates a sample with illumination light emitted from a light source;
an imaging optical system that converges light emitted from the sample to form a sample image by an objective lens;
an aperture member that is disposed in the illumination optical system in the vicinity of a conjugate plane of a rear focal plane of the objective lens and has a slit aperture for limiting the illumination light, the slit aperture being formed in the substantial center of the aperture member, with an optical axis passing through the slit aperture; and
a filter member that includes a phase plate that is disposed in the imaging optical system in the vicinity of the rear focal plane of the objective lens or in the vicinity of the conjugate plane of the rear focal plane of the objective lens and has only two phase areas, the two phase areas dividing a light flux from the sample into two portions and introducing a phase difference of 180 degrees therebetween;
a phase boundary portion between the two phase areas being disposed in an image of the slit aperture that is formed in a conjugate position of the slit aperture and extending substantially parallel to a lengthwise direction of the slit aperture;
wherein the following conditional expression is satisfied:

$$0.05 \leq d1/(2 \times NA \times f \times m) \leq 0.6$$

where d1 denotes a short side width of the slit aperture, NA denotes a numerical aperture of the objective lens, f denotes a focal length of the objective lens, and m denotes magnification from the rear focal plane of the objective lens to the plane in the illumination optical system where the slit aperture is disposed.

2. The microscope apparatus according to claim 1, wherein the filter member further includes a transmittance controlling plate that controls transmittance of the phase plate at the conjugate position of the slit aperture, and the transmittance controlling plate has substantially constant transmittance over the conjugate position of the slit aperture, and transmittance t satisfies the following conditional expression:

$$0 \leq t \leq 50 \text{ (unit: \%)}.$$

3. The microscope apparatus according to claim 2, wherein the filter member includes a plurality of phase plates and a plurality of transmittance controlling plates, and the plurality of phase plates and the plurality of transmittance controlling plates are independently changeable with respect to the optical axis.

4. The microscope apparatus according to claim 3, wherein the filter member is changeable with respect to the optical axis.

5. The microscope apparatus according to claim 1, wherein, in the phase plate, when a phase boundary is assumed to be the Y axis, the axis perpendicular to the Y axis and the optical axis is X axis, and the point of intersection of the X axis and the Y axis is to be an origin, the filter member further includes a transmittance controlling plate that has transmittance distribution such that transmittance of the filter member becomes minimum at the origin, and higher away from the origin, and the transmittance distribution is symmetrical with respect to the Y axis.

6. The microscope apparatus according to claim 1, wherein, in the phase plate, when a phase boundary is assumed to be the Y axis, the axis perpendicular to the Y axis and the optical axis is X axis, and the point of intersection of the X axis and the Y axis is to be an origin, the filter member further includes a transmittance controlling plate that has transmittance distribution such that transmittance of the filter member becomes higher step-by-step away from the origin, and the transmittance distribution is symmetrical with respect to the Y axis.

7. The microscope apparatus according to claim 1, wherein the filter member is changeable with respect to the optical axis.

8. A microscope apparatus comprising:
an illumination optical system that illuminates a sample with illumination light emitted from a light source;
an imaging optical system that converges light emitted from the sample to form a sample image by an objective lens; an aperture member that is disposed in the illumination optical system in the vicinity of a conjugate plane of a rear focal plane of the objective lens and has a slit aperture for limiting the illumination light, the slit aperture being formed in the substantial center of the aperture member, with an optical axis passing through the slit aperture; and
a filter member that includes a phase plate that is disposed in the imaging optical system in the vicinity of the rear focal plane of the objective lens or in the vicinity of the conjugate plane of the rear focal plane of the objective lens and has only two phase areas, the two phase areas dividing a light flux from the sample into two portions and introducing a phase difference of 180 degrees therebetween;
a phase boundary port between the two phase areas being disposed in an image of the slit aperture that is formed in a conjugate position of the slit aperture and extending substantially parallel to a lengthwise direction of the slit aperture;
wherein the filter member further includes a transmittance controlling plate that controls transmittance of the phase plate at the conjugate position of the slit aperture, and the transmittance controlling plate has substantially constant transmittance over the conjugate position of the slit aperture, and transmittance t satisfies the following conditional expression:

$$0 \leq t \leq 50 \text{ (unit: \%)}.$$

9. A microscope apparatus comprising:
an illumination optical system that illuminates a sample with illumination light emitted from a light source;
an imaging optical system that converges light emitted from the sample to form a sample image by an objective lens;
an aperture member that is disposed in the illumination optical system in the vicinity of a conjugate plane of a rear focal plane of the objective lens and has a slit aperture for limiting the illumination light, the slit aperture being formed in the substantial center of the aperture member, with an optical axis passing through the slit aperture; and
a filter member that includes a phase plate that is disposed in the imaging optical system in the vicinity of the rear focal plane of the objective lens or in the vicinity of the conjugate plane of the rear focal plane of the objective lens and has only two phase areas, the two phase areas dividing a light flux from the sample into two portions and introducing a phase difference of 180 degrees therebetween;
a phase boundary portion between the two phase areas being disposed in an image of the slit aperture that is formed in a conjugate position of the slit aperture and extending substantially parallel to a lengthwise direction of the slit aperture;

wherein, in the phase plate, when a phase boundary is assumed to be the Y axis, the axis perpendicular to the Y axis and the optical axis is X axis, and the point of intersection of the X axis and the Y axis is to be an origin, the filter member further includes a transmittance controlling plate that has transmittance distribution such that transmittance of the filter member becomes minimum at the origin, and higher away from the origin, and the transmittance distribution is symmetrical with respect to the Y axis.

10. A microscope apparatus comprising:

an illumination optical system that illuminates a sample with illumination light emitted from a light source;

an imaging optical system that converges light emitted from the sample to form a sample image by an objective lens;

an aperture member that is disposed in the illumination optical system in the vicinity of a conjugate plane of a rear focal plane of the objective lens and has a slit aperture for limiting the illumination light, the slit aperture being formed in the substantial center of the aperture member, with an optical axis passing through the slit aperture; and a filter member that includes a phase plate that is disposed in the imaging optical system in the vicinity of the rear focal plane of the objective lens or in the vicinity of the conjugate plane of the rear focal plane of the objective lens and has only two phase areas, the two phase areas dividing a light flux from the sample into two portions and introducing a phase difference of 180 degrees therebetween;

a phase boundary portion between the two phase areas being disposed in an image of the slit aperture that is formed in a conjugate position of the slit aperture and extending substantially parallel to a lengthwise direction of the slit aperture;

wherein, in the phase plate, when a phase boundary is assumed to be the Y axis, the axis perpendicular to the Y axis and the optical axis is X axis, and the point of intersection of the X axis and the Y axis is to be an origin, the filter member further includes a transmittance controlling plate that has transmittance distribution such that transmittance of the filter member becomes higher step-by-step away from the origin, and the transmittance distribution is symmetrical with respect to the Y axis.

* * * * *